United States Patent
Yano et al.

(10) Patent No.: US 6,167,681 B1
(45) Date of Patent: *Jan. 2, 2001

(54) SEALING APPARATUS (75) Inventors: Keiji Yano, Yokohama; Isao Tezuka, Chiba; Yutaka Iwasaki, Yokohama, all of (JP)

(73) Assignee: Tetra Laval Holdings & Finance S.A., Pully (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/117,430
(22) PCT Filed: Jan. 30, 1997
(86) PCT No.: PCT/US97/01473
  § 371 Date: Nov. 13, 1998
  § 102(e) Date: Nov. 13, 1998
(87) PCT Pub. No.: WO97/28045
  PCT Pub. Date: Aug. 7, 1997

(30) Foreign Application Priority Data

Jan. 30, 1996 (JP) .................................. 8-14090
Jul. 8, 1996 (JP) .................................. 8-177657

(51) Int. Cl.[7] ................................................ B65B 51/10
(52) U.S. Cl. .................. 53/477; 53/373.7; 53/374.6; 53/375.9; 53/374.2
(58) Field of Search ................ 53/451, 551, 374.2, 53/374.6, 375.9, 373.7, DIG. 2

(56) References Cited

U.S. PATENT DOCUMENTS

| 4,067,175 | 1/1978 | Vinokur . |
| 4,512,138 | 4/1985 | Greenawait . |
| 4,630,429 | 12/1986 | Christine . |
| 4,757,668 | 7/1988 | Klinkel et al. . |
| 4,848,063 | 7/1989 | Niske . |
| 5,067,302 | 11/1991 | Boeckmann . |
| 5,284,002 | 2/1994 | Fowler et al. . |
| 5,678,392 | * 10/1997 | Konno .......................... 53/374.2 |
| 5,787,690 | * 8/1998 | Konno .......................... 53/374.2 |

FOREIGN PATENT DOCUMENTS

| 0484998 | 5/1992 | (EP) . |
| 0148426 | * 6/1991 | (JP) ............................ 53/374.2 |

* cited by examiner

Primary Examiner—Eugene Kim
(74) Attorney, Agent, or Firm—Burns, Doane, Swecker, & Mathis, L.L.P.

(57) ABSTRACT

A sealing apparatus is provided with a sealing block and inductors embedded in the sealing block. Each of the inductors is partially exposed above the surface of the sealing block and is provided with a first pressing portion for pressing the packaging material. The sealing apparatus also includes counter elements, each of which is disposed in opposing relation to the inductors so that packaging material can be squeezed between the counter elements and the inductors. In addition, a voltage applying device is provided for inductors and the counter elements are provided with a second pressing portion at a position corresponding to the portion of the packaging material that is nearer to a liquid food than to the sealing zone.

16 Claims, 8 Drawing Sheets

FIG. 12

SEALING APPARATUS

FIELD OF THE INVENTION

This invention generally relates to a sealing apparatus and more particularly concerns an apparatus and method for sealing together plastic layers of packaging material to form a seal.

BACKGROUND OF THE INVENTION

Packaging containers, for example those having a brick shape, for containing liquid food such as milk and soft drinks have been made through the use of packaging machines. These machines form a continuously moving web-shaped packaging material made of a flexible laminate into a tubular shape, which is then filled with the desired liquid food product. The web-shaped packaging material is manufactured with a packaging material manufacturing machine and is placed on a reel. The reel is then installed in the packaging machine where it is reeled out and routed within the packaging machine using drive mechanisms disposed in several positions in the packaging machine. The packaging material is sealed in the longitudinal direction within the packaging machine to form the tubular shape. For this reason, the packaging material possesses a laminate structure made up of a paper base layer, a film coating layer on each side of the paper base layer and, if necessary, an aluminum foil layer interposed between the paper base layer and the film.

While the tubular packaging material is being transferred downward within the packaging machine, liquid food is supplied from above to fill the inside of the tubular packaging material. Next, the packaging material is squeezed from both sides and sealed in the lateral direction at specified intervals to form interconnected primary containers having the desired shape, e.g., pillow shaped, bag shaped, etc.

Next, the laterally extending sealed portions are cut, and each of the resulting primary containers is folded along previously formed crease lines to form a container having a specified shape. Thus, a plurality of packaging containers each containing a specified amount of liquid food are formed.

To seal the packaging material in the longitudinal or lateral direction, plastic films on the packaging material surfaces are positioned so as to face each other. The aluminum foil in the packaging material generates heat by a sealing apparatus such as an inductor, and pressure is applied to heat-fuse and bond together the plastic films.

Figure 2:
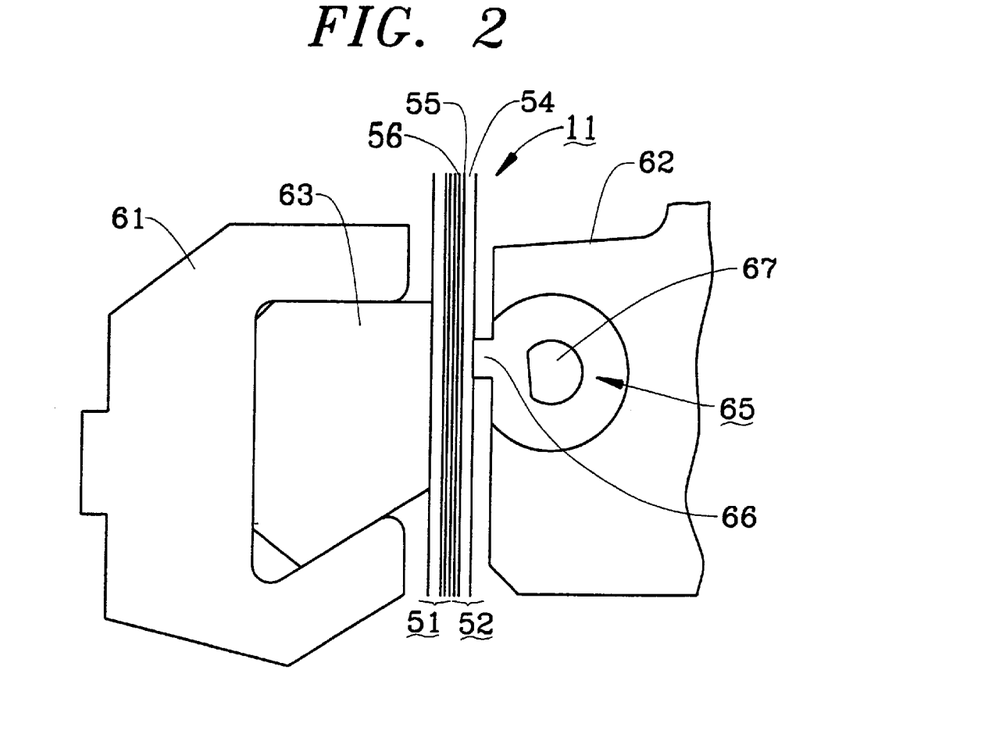
FIG. 2 is a cross-sectional view of a portion of a conventional sealing apparatus during a first stage of the sealing process.
Figure 3:
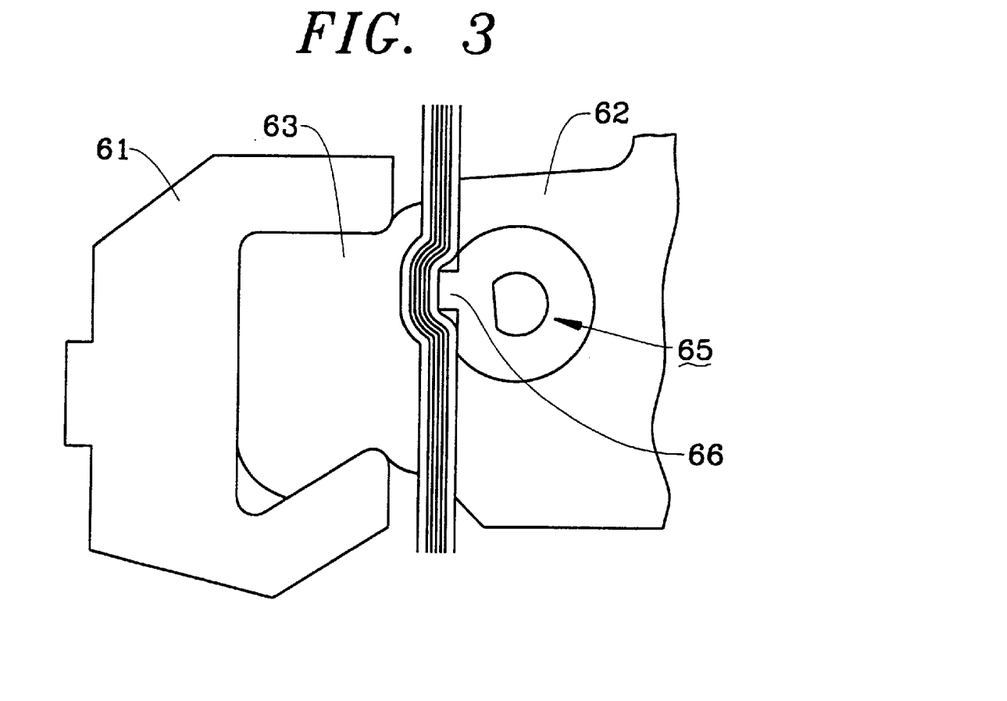
FIG. 3 is a cross-sectional view of a portion of a conventional sealing apparatus during a second stage of the sealing process.
Figure 4:
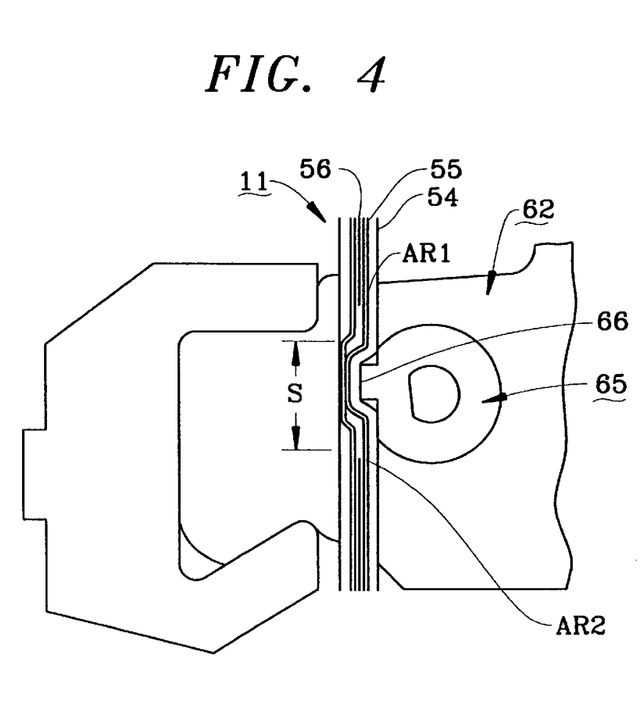
FIG. 4 is a cross-sectional view of a portion of a conventional sealing apparatus during a third stage of the sealing process.

FIGS. 2–4 illustrate various stages in a sealing process using a conventional sealing apparatus. As illustrated, a tubular packaging material 11 is used and web-shaped packaging materials 51, 52 are placed in face to face relation to each other in a sealing zone S. Each of the packaging materials 51, 52 is of a laminate structure made up of a paper base layer 54, an aluminum foil layer 55 located on the inside surface of the paper base layer 54, and a film layer 56 of polyethylene, for example, located on the inside surface of the aluminum foil layer 55. Although not specifically illustrated, the outside surface of the paper base layer 54 is also coated with a layer of plastic material such as polyethylene. The polyethylene portions 56 of the two packaging materials 51, 52 are bonded together by heat fusion.

The conventional machines employ a sealing apparatus to seal and cut the packaging material 11. The sealing apparatus is provided with cutting jaws and heat seal jaws (the specific details of which are not shown) disposed in opposing relation to each other. Each of the cutting jaws is provided with a pair of cutting rails 61 while each of the heat seal jaws is provided with a pair of sealing blocks 62. A cutter (not shown) is disposed in the gap formed between both cutting rails 61.

The cutting rail 61 includes a counter element 63 of rubber that extends along the cutting rail 61, while the sealing block 62 is provided with an inductor 65 disposed opposite to the counter element 63. The inductor 65 extends along the sealing block 62 and is provided with a projection 66 extending toward the cutting jaws. A coolant passage 67 is formed through the inductor 65 to control the temperature of the inductor 65 as a result of coolant flowing through the coolant passage 67.

In the initial stages of the sealing process shown in FIG. 2, the packaging material 11 is placed between the sealing block 62 and the cutting rail 61, whereupon the cutting jaw and the heat seal jaw are moved so that they approach each other. In the subsequent stage shown in FIG. 3, the cutting jaw and the heat seal jaw are moved further towards each other, and the sealing portion of the packaging material 11 is pressed hard and deformed with the inductor 65 and the counter element 63. As shown in FIG. 3, a high frequency voltage is applied with a power device (not shown) to cause the aluminum foil 55 to generate heat with induction current. As a result, paired polyethylene portions 56 of the packaging material facing each other and squeezed between the paired aluminum foils 55 are heated and the polyethylene portions 56 in the sealing zone S are fused. As a result, the packaging material 11 is bonded together by heat fusion.

With conventional sealing apparatus such as that described above, it has been found that melted polyethylene 56 flows excessively beyond the sealing zones of the packaging material 11 and ends up flowing from the sealing zone S to an area AR1 on the cutter side and to an area AR2 on the liquid food side. As a result, the amount of polyethylene 56 contributing to the heat fusion in the sealing zone S decreases and so appropriate bond strength may not be obtained. Consequently, liquid food may leak. Furthermore, it is possible that the polyethylene 56 flowing out from the sealing zone S to the area AR2 on the liquid food side will be rapidly cooled by the liquid food, will solidify, and will adhere to the inside surface of the primary container, thus possibly causing cracks in the vicinity of the sealing zone S during the forming process that is performed after filling and sealing.

If the induction heating energy is reduced in an attempt to prevent the polyethylene material 56 from excessively flowing out of the sealing area S, the polyethylene material 56 typically cannot be melted to the extent necessary and so sufficient bond strength cannot be achieved.

SUMMARY OF THE INVENTION

Generally speaking, a need exists for a sealing apparatus that is not susceptible to the same disadvantages, drawbacks and problems associated with conventional sealing apparatus such as those described above. In particular, it would be desirable to provide a sealing apparatus that is able to prevent melted plastic from flowing out beyond the sealing zone, even when the induction heating energy is increased for purposes of increasing the sealing strength. Similarly, it would be desirable to provide a sealing apparatus that makes it possible to obtain appropriate bond strength in the sealing zone and prevent cracks from being produced in the vicinity of the sealing zone.

In light of the foregoing, the sealing apparatus of the present invention includes a sealing block and a cutting bar positioned in opposing relation to the sealing block. A pair of spaced apart inductors is positioned in the sealing block, with each inductor being partially exposed above the front surface of the sealing block and with each inductor being provided with a first pressing portion for pressing packaging material during a sealing operation. A pair of spaced apart counter elements is mounted in the cutting bar, with each counter element being positioned in opposing relation to one of the inductors to permit the packaging material to be held between the counter elements and the inductors. A voltage applying device applies a high frequency voltage to the inductors. At least one of the inductors or the counter elements is provided with a second pressing portion that is disposed at a position corresponding to a portion of the packaging material that is nearer to the liquid food than to the sealing zone in order to press the packaging material at the time of sealing to prevent melted plastic from flowing outwardly beyond the sealing zone towards the liquid food.

According to another aspect of the invention, a method for producing a sealing zone in tubular packaging material having an outermost plastic layer and an adjacent aluminum foil layer and containing liquid involves positioning the tubular packaging material between a cutting bar and a sealing block. The sealing block includes at least one inductor embedded in the sealing bar so that a portion of the inductor being exposed at the front surface of the sealing block and provided with a first pressing portion extending towards the cutting bar. The cutting bar includes at least one counter element positioned in opposing relation to the inductor. The method further involves pressing the tubular packaging material between the cutting bar and the sealing bar to bring together opposing portions of the plastic layer and deform a portion of the tubular packaging material along a sealing zone disposed at a location corresponding to the first pressing portion, and then applying high frequency voltage to the inductor to generate heat in the aluminum foil layer and melt the adjacent plastic layer so that the opposing portions of the plastic layer of the tubular packaging material are bonded together by heat fusion in the sealing zone. Portions of the packaging material located nearer the liquid than the sealing zone are also pressed together to prevent melted plastic from flowing outwardly from the sealing zone towards the liquid.

BRIEF DESCRIPTION OF THE DRAWING FIGURES

Further details and features associated with the present invention will become more readily apparent from the detailed description set forth below considered in conjunction with the accompanying drawing figures in which like elements are designated by like reference numerals and wherein.

DETAILED DESCRIPTION OF THE INVENTION

Figure 5:
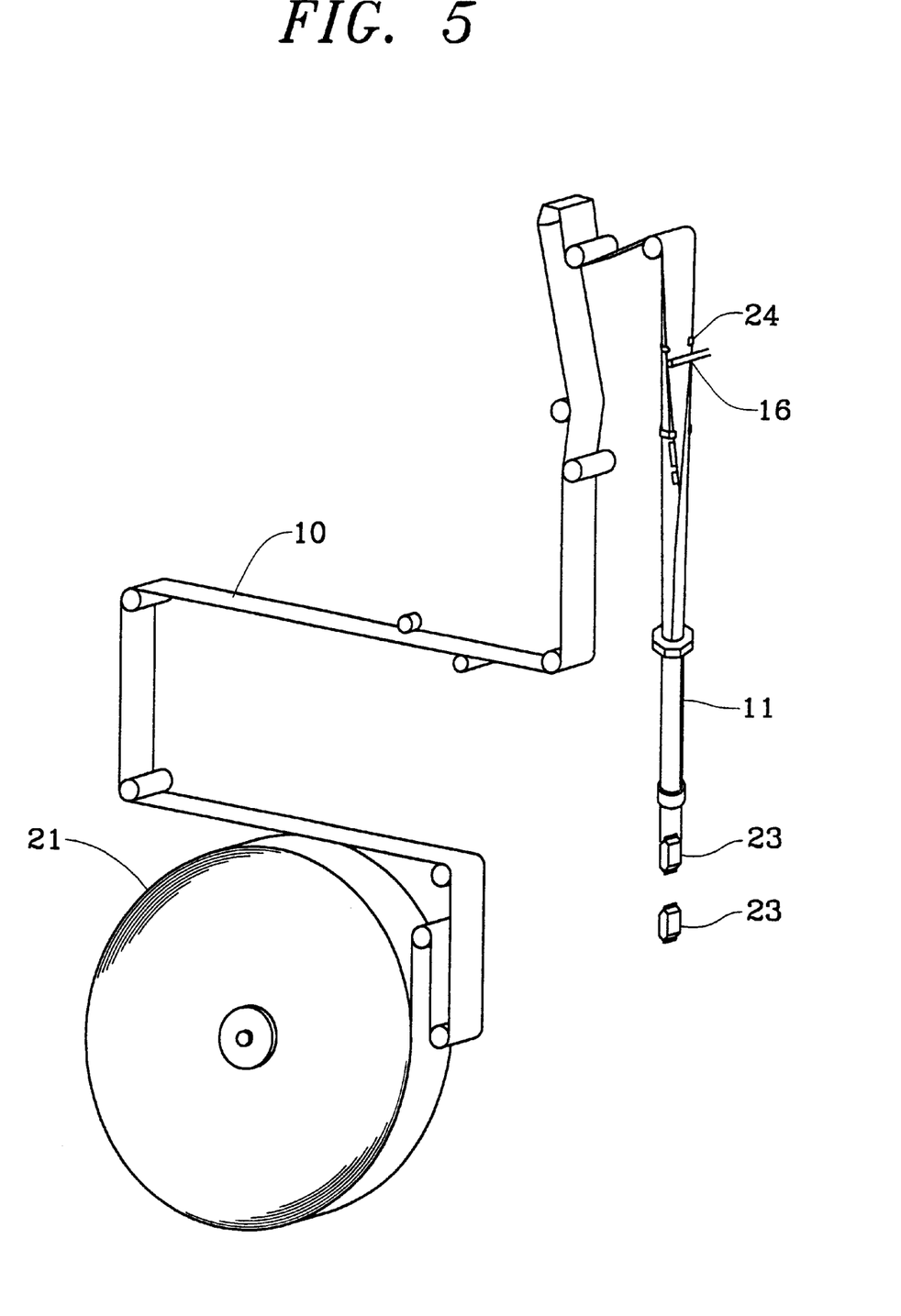
FIG. 5 is a general schematic illustration of a portion of the packaging machine in which is employed the sealing apparatus of the present invention.

With reference initially to FIG. 5, a web-shaped packaging material 10 comprised of a flexible laminate that is manufactured with a packaging material manufacturing machine is installed as a reel 21 in a packaging machine. The packaging material 10 is reeled out and routed with various drive mechanisms (not specifically shown) that are disposed at several places in the packaging machine. The packaging material 10 is formed by laminating, for example, a polyethylene layer, an aluminum foil layer, a paper base sheet, and a polyethylene layer in that order from inside to outside.

The packaging material 10 is guided with the aid of a guide 24, sealed in the longitudinal direction with a sealing apparatus (not specifically shown) and formed into a tubular packaging material 11. While the tubular packaging material 11 is being fed downward, liquid food is supplied from above through a filler pipe 16 to fill the inside of the packaging material 11. Next, the packaging material 11 is laterally squeezed from both sides with a cutting jaw and a heat sealing jaw (both not specifically shown in FIG. 5) so that the tubular packaging material is sealed in the lateral direction at specified intervals to form pillow-shaped primary containers 23.

Next, the laterally extending sealed portions are cut to separate the individual pillow-shaped primary containers 23. The resulting primary containers 23 are folded along previously impressed crease lines to form a specified or desired shape, and are completed as one of a plurality of package containers each containing a specified amount of liquid food.

Figure 1:
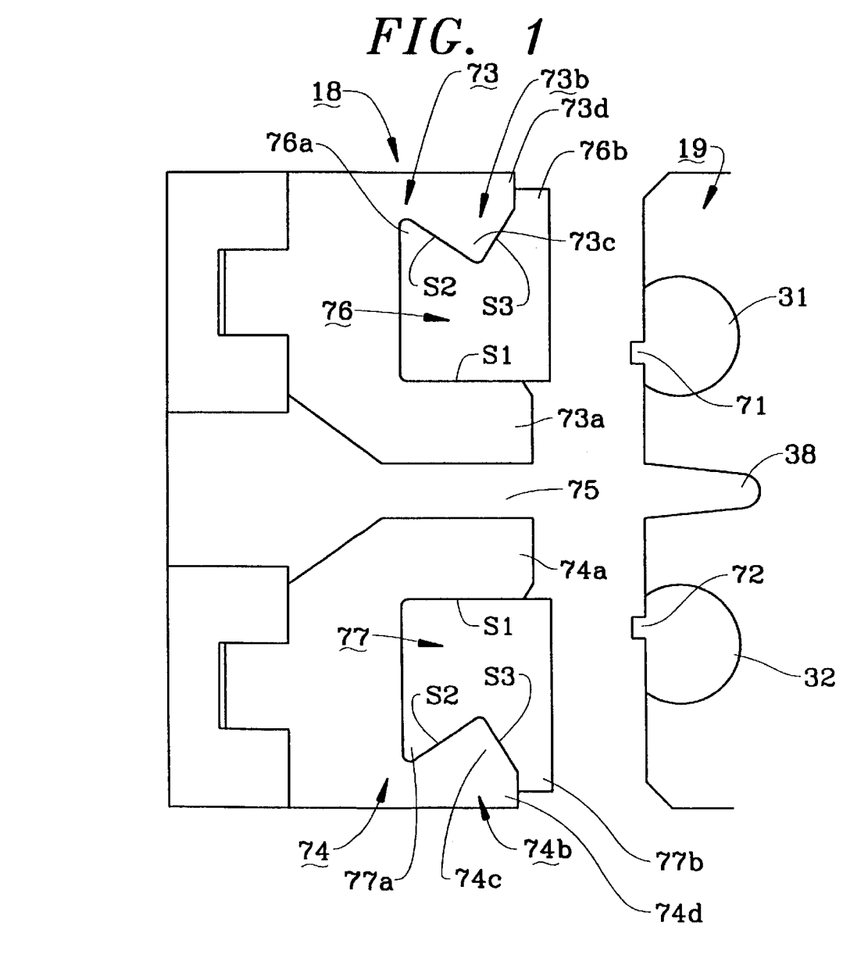
FIG. 1 is a cross-sectional view of a part of a sealing apparatus according to a first embodiment of the present invention.
Figure 6:
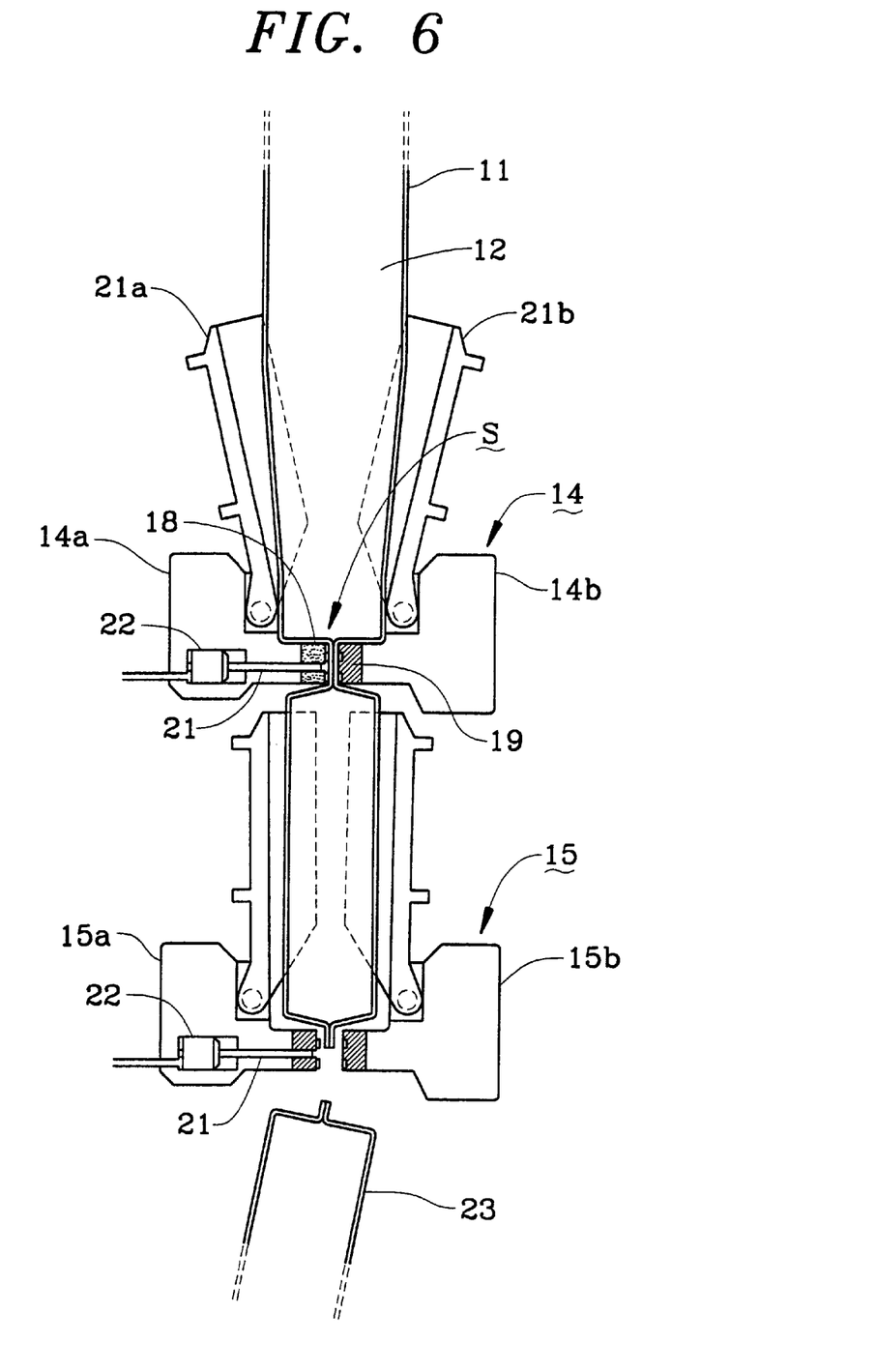
FIG. 6 is a side view, partially in section, of the sealing apparatus of the present invention during use.

With reference to FIGS. 1 and 6, the packaging material 11 is continuously fed downward and squeezed with two seal-cutting units 14, 15 at specified intervals so that opposing portions of the plastic layer are brought together and sealed in the lateral direction to form a band-like sealing zone S. The sealing zone S is then cut apart to form a primary container 23 containing a specified amount of liquid food 12. For this purpose, the seal-cutting units 14, 15 are provided with cutting jaws 14a, 15a and heat sealing jaws 14b, 15b, respectively.

To increase the processing speed of the sealing apparatus, two sets of the seal-cutting units 14, 15 having an identical structure are provided and are operated in turns with their process timings staggered by a half cycle from each other.

A cutting bar 18 is provided at the fore-end of each of the cutting jaws 14a, 15a. A sealing block or inductor insulator 19 is provided at the fore-end of each of the heat-seal jaws 14b, 15b. The cutting jaws 14a, 15a and the heat-seal jaws 14b, 15b are moved towards the packaging material with the cutting bars 18 and the sealing blocks 19 to squeeze the packaging material 11 from both sides and thus bring the opposing plastic surfaces of the packaging material in contact with each other to seal them in the lateral direction.

In the center of each of the cutting jaws 14a, 15a is a laterally arranged flat-shaped cutter 21 that is adapted to be extended or retracted as required. The cutter 21 is arranged, when extended, to cut in the center or intermediate portion of the sealing zone S. To effect the necessary movement of the cutter 21 between the extended and retracted positions, a cylinder 22 is provided at the rear end of the cutter 21. The cutter 21 may be extended or retracted by supplying or discharging working medium to or from the cylinder 22.

Paired flaps 21a, 21b are also provided on either side of the tubular packaging material and are designed to pivot for free swinging movement relative to the cutting jaws 14a, 15a and the heat sealing jaws 14b, 15b. The flaps 21a, 21b are adapted to surround, guide, and form the packaging material 11 into a generally rectangular shape.

In FIG. 6, the seal-cutting unit 14 is in the seal-cutting start position where the cutting jaw 14a and the heat sealing jaw 14b are moved towards the packaging material 11 to squeeze it from both sides and bring the opposing surfaces of the packaging material 11 into contact with each other. As the seal-cutting unit 14 moves downward, while squeezing and holding the packaging material 11, the sealing zone S is bonded and formed.

The seal-cutting unit 15 shown in FIG. 6 is in the seal-cutting end position where the cutter 21 of the seal-cutting unit moves toward the sealing zone S to cut the center or intermediate portion of the sealing zone S and separate the primary container 23 from the packaging material 11. Once the center of the sealing zone S is cut, the cutting jaw 15a and the heat sealing jaw 15b of the seal-cutting unit 15 are retracted, rotated and raised to the seal-cutting start position. When the seal-cutting unit 15 moves to the seal-cutting start position, and the cutting jaw 15a and the heat sealing jaw 15b are moved towards the sealing zone S, the cutter 21 of the seal-cutting unit 14 moves towards the sealing zone S to effect a cut at the center or intermediate portion of the sealing zone S, thereby separating the primary container 23 from the packaging material 11.

Although not specifically illustrated, the seal-cutting units 14, 15 are provided with cylinder mechanisms arranged to draw together the cutting jaw 14a (or 15a) and the heat sealing jaw 14b (or 15b) to impart the necessary pressing force at the time of sealing. The pressing force between the cutting jaw 14a (or 15a) and the heat sealing jaw 14b (or 15b) is removed in a short period of time and the seal-cutting units 14, 15 reach the seal-cutting end position.

FIG. 1 illustrates various the features associated with the cutting bar 18 and the sealing block 19. A pair of inductors or inductor bodies 31, 32 are embedded in the sealing block 19 so that a part of each of the inductors 31, 32 is exposed on the end surface of the sealing block 19. Each of the inductors 31, 32 is connected to a power source through a connecting part.

A groove 38 is formed in the sealing block 19 and is located between the two inductors 31, 32. This groove 38 extends along the sealing block 19 and is designed to accommodate the fore-end of the cutter 21 when it is extended.

Each of the inductors 31, 32 is respectively formed with a raised portion 71, 72 that forms a first pressing portion. The raised portions 71, 72 extend towards the cutting bar 18 and are disposed in the longitudinal direction of the inductors 31, 32.

The cutting bar 18 is provided with paired cutting rails 73, 74. The cutter 21 is adapted to move within a gap 75 defined between the cutting rails 73, 74.

Each of the cutting rails 73, 74 is provided with a counter element 76, 77 that extends along the cutting rails 73, 74. Each counter element 76, 77 is mounted in a groove in the respective cutting rail 73, 74. The sealing zone S of the tubular packaging material 11 is pressed hard with the counter elements 76, 77. For this reason, the counter elements 76, 77 are made of a rubber material having a Shore Hardness of about 95. In addition, each of the counter elements 76, 77 has a front surface that faces the sealing block 19. As depicted in FIG. 1, the front surface of each of the counter elements is flat or planar.

Each of the cutting rails 73, 74 is also provided with first holding portions 73a, 74a and second holding portions 73b, 74b for holding the counter elements 76, 77 in place. Each of the first holding portions 73a, 74a has a surface S1 extending towards the sealing block 19. The surface S1 is generally perpendicular to the front surface of the sealing block 19. Each of the second holding portions 73b, 74b has oblique surfaces S2, S3 that form projections 73c, 74c. Each of projections 73c, 74c is oriented in the direction towards the cutter 21.

Each of the counter elements 76, 77 has a respective engage-stop portion 76a, 77a generally in the form of a projection. The counter elements 76, 77 are secured inside the respective cutting rails 73, 74 by the interengagement of the engage-stop portions 76a, 77a and the respective projections 73c, 74c.

The counter elements 76, 77 are also provided with respective extensions 76b, 77b that form second pressing portions. These extensions 76b, 77b extend along the front surface of the respective cutting rail 73, 74. Also, the extensions 76b, 77b extend from the sealing zone S of the packaging material 11 towards the liquid food 12 to press the portions of the packaging material 11 which are nearer to the liquid food 12 than to the sealing zone S.

To prevent the extensions 76b, 77b from deflecting when the counter elements 76, 77 are pressed against the packaging material 11 and to thereby prevent the pressing force from decreasing as a result of such deflection, each of the cutting rails 73, 74 is provided with a respective holding portion 73d, 74d extending along the extensions 76b, 77b.

By virtue of this construction, when the opposing plastic or polyethylene portions of the packaging material are melted and pressed together by the raised portions 71, 72, the melted plastic or polyethylene does not flow out towards the liquid food 12 side beyond the sealing zone S because the extensions 76b, 77b press the portions of the packaging material 11 which are nearer to the liquid food 12 than to the sealing zone S. As a result, the amount of plastic or polyethylene contributing to heat fusion in the sealing zone S is ensured. Thus, the appropriate and necessary bond strength is obtained. At the same time, the liquid food 12 is prevented from leaking. In addition, cracks are prevented from appearing in the vicinity of the sealing zone S in the forming process after filling and sealing.

A further advantageous result of the construction of the sealing apparatus of the present invention is that since the extensions 76b, 77b press together the portions of the packaging material 11 which are nearer to the liquid food 12 than to the sealing zone S, the liquid food 12 is prevented from remaining within the sealing zone S. Therefore, the liquid food 12 is prevented from mixing with the melted plastic or polyethylene. Consequently, the bond strength of the seal is not detrimentally reduced. Moreover, although a small amount of plastic or polyethylene may flow from the sealing zone S of the packaging material 11 towards the cutter 21, this melted plastic or polyethylene is not cooled with the liquid food 12 and so cracks are not liable to result.

Figure 7:
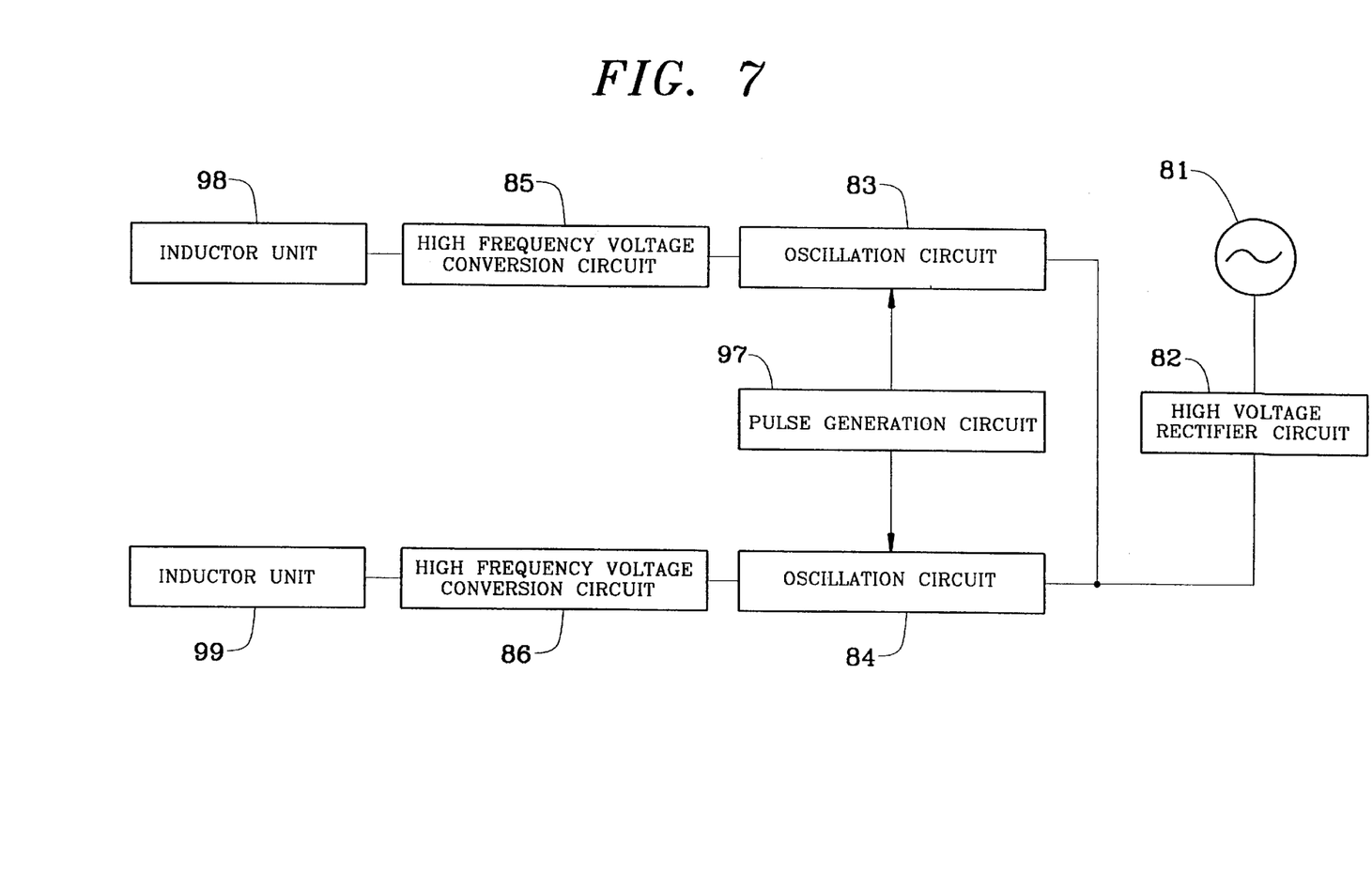
FIG. 7 is a general system diagram illustrating the power circuit utilized in the present invention.

The inductors 31, 32 are connected to a power circuit or voltage applying device so that a high frequency voltage generated by the power circuit is applied to the inductors 31, 32. FIG. 7 sets forth a schematic illustration of the power circuit. An AC power source 81 generates three phase AC power, and a high voltage rectifier circuit 82 converts AC voltage generated by the AC power source 81 into DC voltage.

The DC voltage generated with the high voltage rectifier circuit 82 is applied to a pair of oscillation circuits 83, 84 which generate high frequency pulses. The oscillation circuits 83, 84 are connected to a pulse generation circuit 97 which receives pulses of a specified frequency. Each of the oscillation circuits 83, 84 is also connected to a respective high frequency voltage conversion circuit 85, 86 to generate high frequency voltages that are then applied to respective inductor units 98, 99. In this case, the inductor units 98, 99 shown in FIG. 7 are disposed to correspond to the seal-cutting units 14, 15 depicted in FIG. 6, and comprise the inductors 31, 32 illustrated in FIG. 1, respectively.

When the high frequency voltage generated with the high frequency voltage conversion circuits 85, 86 is applied to the inductors 31, 32, an electric field which changes according to the high frequency voltage is formed between the inductors 31, 32 and the aluminum foil in the packaging material. As a result, an eddy current is produced in the aluminum foil which generates heat by eddy current loss.

Figure 8:
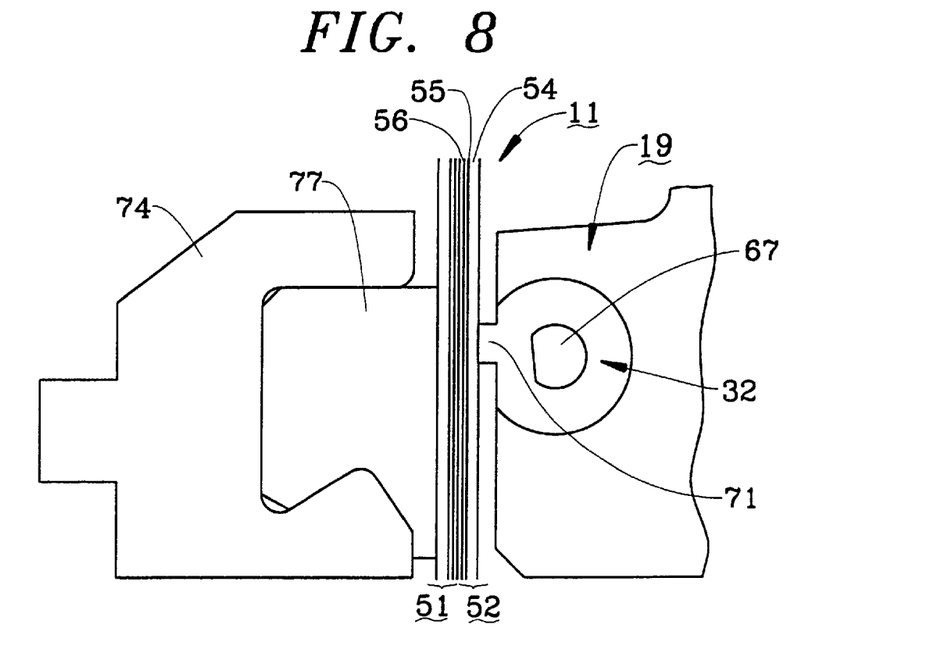
FIG. 8 is a cross-sectional view of a portion of the sealing apparatus of the present invention during a first stage of the sealing process.
Figure 9:
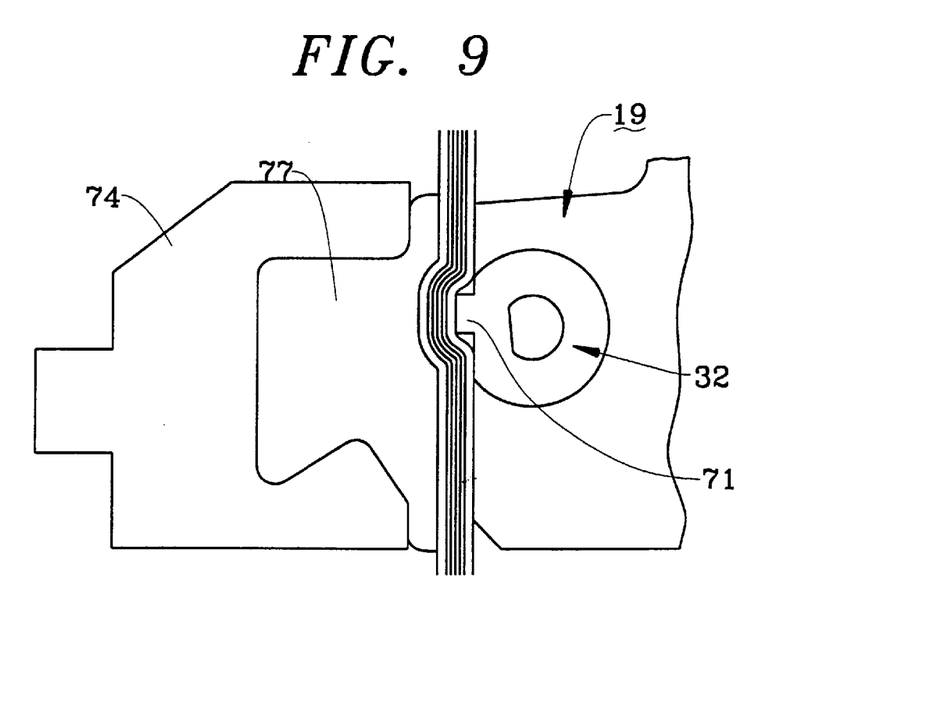
FIG. 9 is a cross-sectional view of a portion of the sealing apparatus of the present invention during a second stage of the sealing process.
Figure 10:
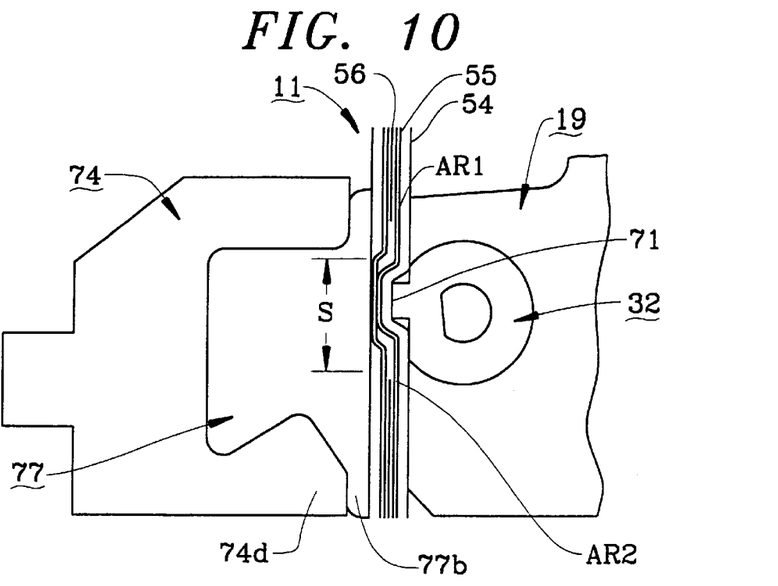
FIG. 10 is a cross-sectional view of a portion of the sealing apparatus of the present invention during a third stage of the sealing process.

The operation of the sealing apparatus of the present invention is described below with reference to FIGS. 8–10, where FIG. 8 illustrates the sealing apparatus during a first stage of the sealing operation, FIG. 9 shows the sealing apparatus during a second stage of the sealing operation, and FIG. 10 depicts the sealing apparatus during a third stage of the sealing operation.

FIGS. 8–10 show the tubular packaging material 11 in general, and also illustrate the web-shaped packaging materials 51, 52 that face each other in the sealing zone S. Each of the packaging materials 51, 52 is of a laminate structure comprising a paper base layer 54, an aluminum foil layer 55 positioned on the inside surface of the paper base layer 54, and a plastic film or layer 56, for example polyethylene, positioned on the inside surface of the aluminum foil layer 55. The outside surface of the paper base layer 54 is also coated with a plastic layer or film, for example polyethylene, although this layer is not specifically illustrated in order to avoid excessive details in the drawing figures. The plastic or polyethylene portions 56 of the packaging materials 51, 52 are intended to be bonded together by heat fusion.

A sealing apparatus is disposed to seal and cut the packaging material 11. The sealing apparatus is provided with cutting jaws 14a, 15a and heat sealing jaws 14b, 15b that are disposed in opposing relation to one another as shown in FIG. 6. A cutting rail 74 is also disposed at the cutting jaws 14a, 15a and a sealing block 19 is disposed at the heat sealing jaws 14b, 15b.

The cutting rail 74 is provided with a counter element 77 extending along the cutting rail 74 and the sealing block 19 includes an inductor 32 positioned in opposing relation to the counter element 77. A coolant flow passage 67 is provided in the inductor 32 for providing coolant flow through the inductor. FIG. 10 also illustrates the holding section 74d on the cutting rail 74.

In the first stage of the sealing operation shown in FIG. 8, the packaging material 11 is placed between the sealing block 19 and the cutting rail 74. The cutting jaws 14a, 15a and the heat sealing jaws 14b, 15b are then moved towards each other.

In the second stage of the sealing process shown in FIG. 9, the cutting jaws 14a, 15a and the heat seal jaws 14a, 15b further move towards one another. This causes the sealing zone S of the packaging material 11 to be pressed hard and deformed with the inductor 32 and the counter element 77.

In the third stage of the sealing operation shown in FIG. 10, a high frequency voltage is applied from the high frequency voltage conversion circuit 86 shown in FIG. 7 to the inductor 32 to cause the aluminum foil 55 to generate heat with induction current. As a result, the pair of plastic or polyethylene portions 56 sandwiched between the pair of aluminum foils 55 are heated. As shown in FIG. 10, the packaging material 11 is thus bonded by heat fusion in the sealing zone S.

During the sealing operation, the plastic or polyethylene portions 56 facing each other are melted and pressed with the raised portion 71. This would normally cause the melted plastic or polyethylene 56 to flow outwardly beyond the sealing zone S. However, since the extensions 76b, 77b press together the portions AR2 of the packaging material 11 which are nearer to the liquid food 12 than to the sealing zone S, the melted plastic or polyethylene 56 is prevented from flowing outwardly from within the sealing zone S towards the liquid food 12. The area AR1 in FIG. 10 denotes the area which is nearer to the cutter 21 than to the sealing zone S.

Figure 11:
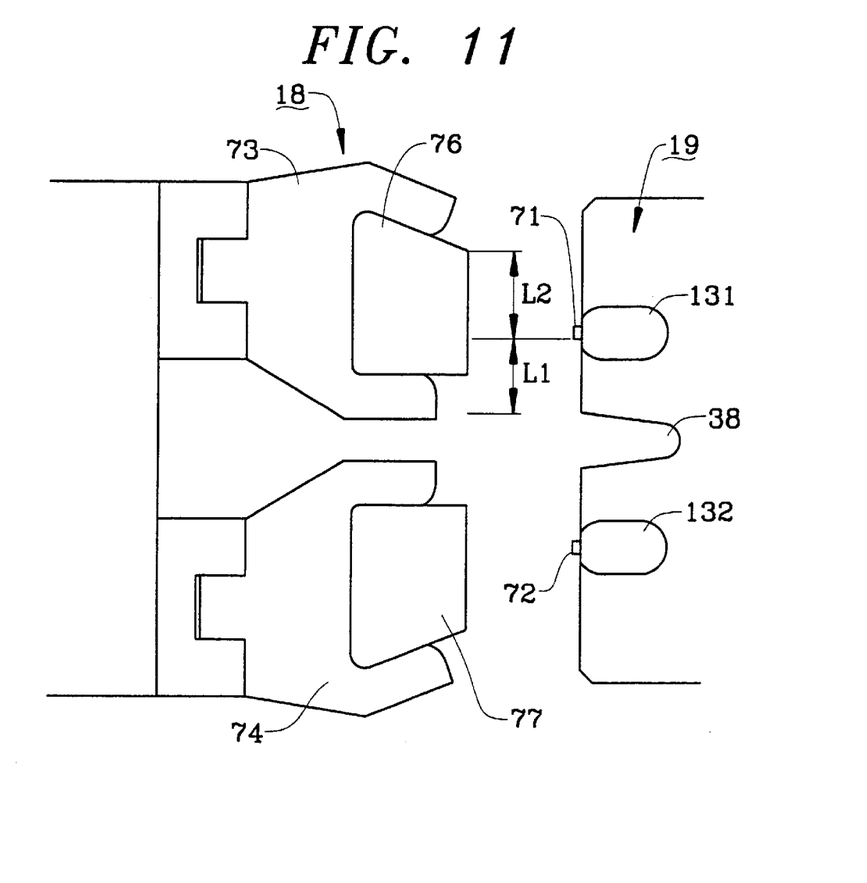
FIG. 11 is a cross-sectional view of a part of a sealing apparatus according to another embodiment of the present invention.

A second embodiment of the sealing apparatus of the present invention is shown in FIG. 11. In this embodiment, the inductors 131, 132 have an elliptic or generally elliptical cross-sectional shape, and are disposed nearer to the cutter 21 than to the outer edge of the counter elements 76, 77. As a result, the respective distances L1 between each raised portion 71, 72 and the groove 38 as measured along the front surface of the sealing block is shorter than the respective distance L2 between each raised portion 71, 72 and the outermost edge of the respective counter element 76, 77 as measured along the front surface of the sealing block.

As a result, the portions of the counter elements 76, 77 between the raised portions 71, 72 (i.e., the place where the raised portions 71, 72 contact the respective counter elements 76, 77) and the outermost edges of the counter elements 76, 77 function as second pressing portions which press the portions of the packaging material 11 that are nearer to the liquid food 12 than to the sealing zone S. As a result, melted plastic or polyethylene 56 does not flow out beyond the sealing zone S towards the liquid food 12.

Figure 12:
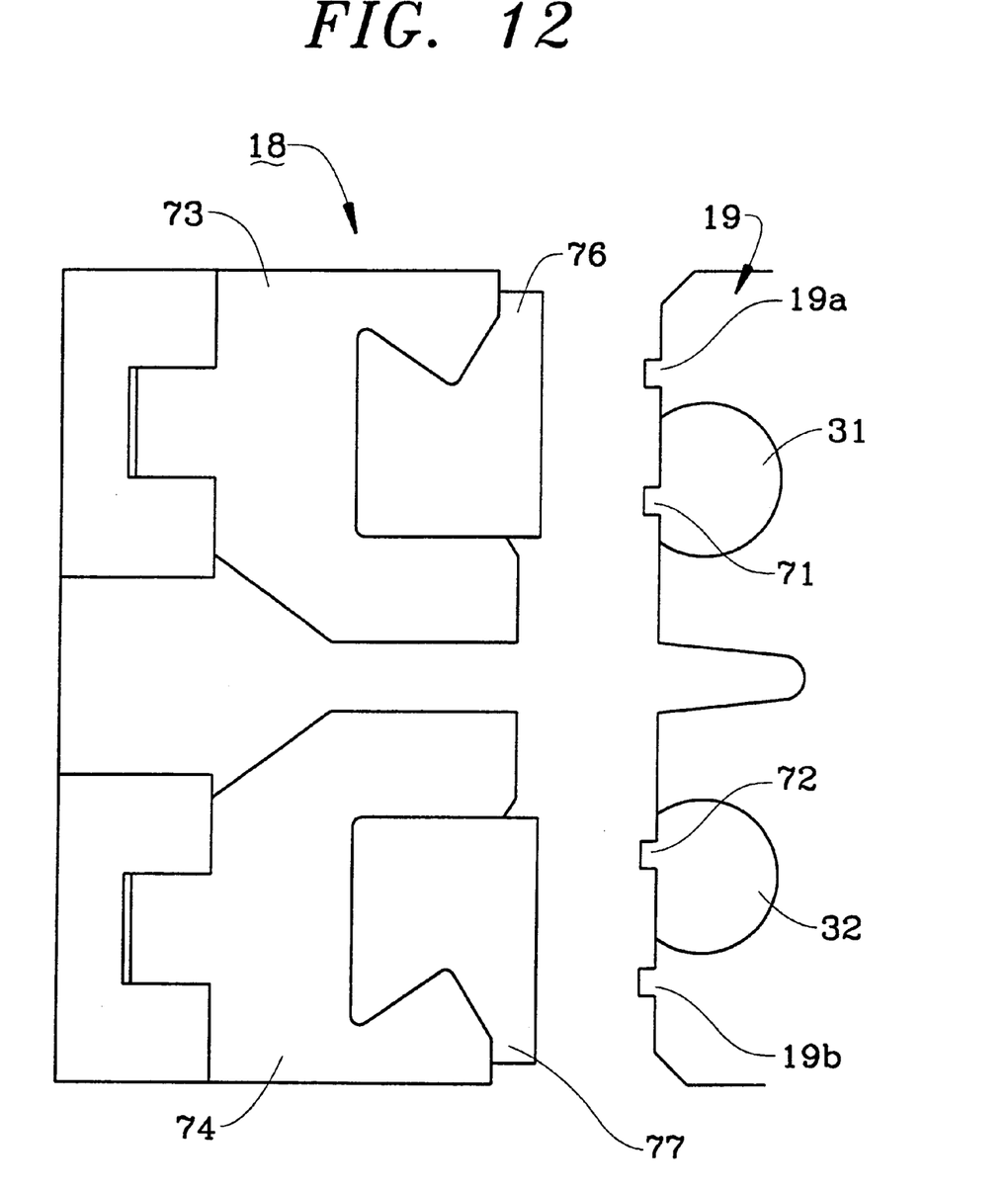
FIG. 12 is a cross-sectional view of a part of a sealing apparatus according to a still further embodiment of the present invention.

According to a third embodiment of the invention shown in FIG. 12, the sealing apparatus is designed so that the surfaces of the sealing block 19 that face the counter elements 76, 77 are each formed with a raised portion 19a, 19b disposed parallel to the inductors 31, 32. These raised portions 19a, 19b serve as the second pressing portions. When the cutting bar 18 and the sealing block 19 are moved so as to approach one another, the raised portions 19a, 19b press the portions of the packaging material 11 that are located nearer to the liquid food 12 than to the sealing zone S. As a result, melted plastic or polyethylene 56 does not flow out beyond the sealing zone S toward the liquid food 12.

The sealing apparatus according to the present invention as described above includes the combination of the sealing block, the inductors embedded in the sealing block to expose a portion of each inductor at the sealing block surface and provided with a first pressing portion for pressing the packaging material at the time of sealing, the counter elements that squeeze the packaging material, and the voltage applying device that applies a high frequency voltage to the inductors. When the high frequency voltage is applied from the voltage applying device to the inductors, induction current causes the aluminum foil of the packaging material to generate heat. As a result, the plastic material coating the packaging material is heated and bonded by heat fusion in the sealing zone S.

At least one of the inductors and counter elements is advantageously provided with the second pressing portion for pressing the packaging material which is nearer to the liquid food than to the sealing zone S. Thus, even if the plastic portions of the packaging material facing each other are melted and pressed with the first pressing portion, the plastic is prevented from flowing out beyond the sealing zone towards the liquid food because the second pressing portion presses the portion of the packaging material which is nearer to the liquid food than to the sealing zone. Consequently, melted plastic does not flow out beyond the sealing zone. This is so even if the induction heating energy is increased for purposes of increasing the sealing strength. Since the melted plastic is prevented from flowing outwardly in this regard, the appropriate bond strength can be obtained in the sealing zone, and cracks are prevented from appearing in the vicinity of the sealing zone.

In addition, the amount of plastic contributing to heat fusion in the sealing zone is maintained and so the bond strength in the sealing zone is not undesirably lowered. The bond strength is maintained even if a higher bond temperature is used by increasing the high frequency voltage supplied from the voltage applying device or a greater force is used to squeeze the packaging material. As a result, high speed processing is possible by shortening the operation cycle of the sealing apparatus.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A sealing apparatus for producing a sealing zone in packaging material having a plastic layer and containing liquid food, comprising:

a cutting bar;

a sealing block having a front surface;

at least a first inductor and a second inductor embedded in said sealing block, said first inductor and second inductor each being partially exposed at the front surface of said sealing block, each inductor being provided with a pressing portion for pressing packaging material during a sealing operation;

at least one counter element disposed in opposing relation to the first inductor, the counter element having a front surface for pressing packaging material against said front surface of said sealing block, said cutting bar having a front surface that faces said front surface of said sealing block, said cutting bar having a recess located in said front surface of said cutting bar, said recess opening to said front surface of said cutting bar and receiving said counter element, said counter element having an extension possessing a surface that faces said front surface of said cutting bar prior to the sealing apparatus producing the sealing zone, said extension of said counter element extending along the front surface of said cutting bar and extending outwardly beyond said recess that opens to said front surface of said cutting bar in a direction away from the second inductor;

voltage applying means for applying a high frequency voltage to said inductors.

2. A sealing apparatus according to claim 1, further comprising another element, said cutting bar having another recess and a pair of cutting rails each having one of said recesses.

3. A sealing apparatus according to claim 2, wherein each of said cutting rails includes a holding portion for holding the respective counter element in place on the cutting rail.

4. A sealing apparatus according to claim 3, wherein each second holding portion is a projection defined by a pair of obliquely oriented surfaces.

5. A sealing apparatus according to claim 4, wherein each of said counter elements includes an engage-stop portion that engages said projection on the respective cutting rail.

6. A sealing apparatus according to claim 2, wherein said cutting rails are spaced apart from each other, said cutting bar including a groove positioned between said cutting rails, said groove for receiving a cutter for cutting the packaging material.

7. A sealing apparatus according to claim 1, further comprising another counter element, said cutting bar having another front surface having a recess that receives said another counter element, said another counter element having an extension possessing a surface that faces said another front surface of said cutting bar prior to the sealing apparatus producing the sealing zone, said extension of said another counter element extending in a direction away from the first inductor.

8. A sealing apparatus for producing a sealing zone in packaging material having a plastic layer and containing liquid food, comprising:

a sealing block having a front surface;

an inductor embedded in said sealing block, said inductor being partially exposed at the front surface of said sealing block, said inductor being provided with a pressing portion for pressing packaging material during a sealing operation;

a cutting bar having a groove for receiving a cutter to cut said packaging material, said cutting bar having a counter element disposed in opposing relation to said inductor, said counter element having a front surface for pressing the packaging material against said front surface of said sealing block; and voltage applying means for applying a high frequency voltage to said inductor;

wherein said counter element possesses an outermost edge, a distance between the pressing portion of the inductor and the outermost edge of the counter element as measured along the front surface of the sealing block being greater than a distance between the pressing portion of the inductor and the groove as measured along the front surface of the sealing block.

9. A method of producing a sealing zone in tubular packaging material, comprising:

transporting tubular packaging material comprised of an outermost plastic layer and an adjacent aluminum foil layer and containing liquid to a position located between a cutting bar and a sealing block, the sealing block including at least one inductor embedded in the sealing bar with a portion of the inductor being exposed at a front surface of the sealing block, the inductor including a pressing portion extending towards the cutting bar, the cutting bar including at least one counter element positioned in opposing relation to the inductor, the cutting bar having a front surface that faces the front surface of the sealing block, the cutting bar having at least one recess located in the front surface of the cutting bar the at least one recess receiving the at least one counter element, a portion of the counter element being located external of the at least one recess and having a rear surface that faces the front surface of the cutting bar prior to producing the sealing zone in the tubular packaging material, said portion of the counter element having said rear surface extending radially beyond the recess along the front surface of the cutting bar and in a direction away from a cutting zone where the packaging material is cut, the counter element having a front surface;

pressing the tubular packaging material between the front surface of the sealing block and the front surface of the counter element to bring together opposing portions of the plastic layer and deform a portion of the tubular packaging material along a sealing zone disposed at a location corresponding to the pressing portion;

applying high frequency voltage to the inductor to generate heat in the aluminum foil layer and melt the adjacent plastic layer so that the opposing portions of the plastic layer of the tubular packaging material are bonded together by heat fusion in the sealing zone;

pressing together portions of the packaging material located nearer the liquid than the sealing zone with the portion of the counter element having said rear surface to prevent melted plastic from flowing outwardly from the sealing zone towards the liquid; and cutting the packaging material.

10. A method according to claim 9, wherein said step of pressing together portions of the packaging material located nearer the liquid than the sealing zone is performed during application of the high frequency voltage to the inductor.

11. A method according to claim 10, wherein the sealing block includes a pair of spaced apart inductors embedded in the sealing bar, and the cutting bar includes a pair of counter elements each positioned in opposing relation to one of the inductors, and wherein the tubular packaging material is pressed between the cutting bar and the sealing bar to bring together opposing portions of the plastic layer and deform the tubular packaging material at two spaced apart locations corresponding to the pressing portion of each inductor.

12. A sealing apparatus for producing a sealing zone in packaging material having a plastic layer and containing liquid food, comprising:

a sealing block having a front surface and a raised portion raised with respect to said front surface, said sealing block including an inductor having a pressing portion for pressing packaging material during a sealing operation, said pressing portion being spaced from said raised portion of said sealing block with said raised portion of the sealing block being spaced from the inductor and being located on a radially outward side of the inductor; and a counter element located in opposing relation to the inductor and having a front surface, the front surface of the counter element for forcing the packaging material against the first pressing portion of the inductor and the raised portion of the sealing block, said raised portion of said sealing block being located to prevent melted plastic from flowing outwardly beyond the sealing zone toward the liquid food at the time of sealing.

13. A sealing apparatus according claim 12, wherein the inductor is a first inductor, further comprising a second inductor located downstream of the first inductor with respect to a direction of transport of the packaging material between the sealing block and the counter element, the raised portion of the sealing block being located upstream of said pressing portion of said first inductor with respect to said transport direction.

14. The sealing apparatus according to claim 13, wherein the second inductor includes a pressing portion and the sealing block includes another raised portion, the pressing portion of the second inductor being located upstream of said another raised portion with respect to the transport direction of the packaging material.

15. The sealing apparatus according to claim 12, further comprising a voltage applying device for a applying a high frequency voltage to the inductor.

16. The sealing apparatus according to claim 12, wherein the inductor is located between the raised portion of the sealing block and a groove formed in said sealing block for accommodating a cutter.

* * * * *